(12) United States Patent
Hall et al.

(10) Patent No.: US 10,452,844 B2
(45) Date of Patent: Oct. 22, 2019

(54) PROTECTING ISOLATED SECRET DATA OF INTEGRATED CIRCUIT DEVICES

(75) Inventors: William E. Hall, Clinton, CT (US); Stefan P. Jackowski, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1685 days.

(21) Appl. No.: 12/323,670

(22) Filed: Nov. 26, 2008

(65) Prior Publication Data

US 2010/0132048 A1    May 27, 2010

(51) Int. Cl.
G06F 21/55 (2013.01)
G06F 21/78 (2013.01)
G06F 21/81 (2013.01)

(52) U.S. Cl.
CPC ............ *G06F 21/554* (2013.01); *G06F 21/78* (2013.01); *G06F 21/81* (2013.01); *G06F 2221/2143* (2013.01)

(58) Field of Classification Search
CPC ......................................... G06F 21/55–21/554
USPC .................. 726/1–36; 714/30, 733; 716/112; 326/8, 59, 60
See application file for complete search history.

(56) References Cited

U.S. PATENT DOCUMENTS

| | | | |
|---|---|---|---|
| 6,553,513 B1 * | 4/2003 | Swoboda et al. | ................ 714/28 |
| 6,715,085 B2 | 3/2004 | Foster et al. | |
| 6,851,056 B2 | 2/2005 | Evans et al. | |
| 6,957,335 B2 | 10/2005 | Foster et al. | |
| 7,089,419 B2 | 8/2006 | Foster et al. | |
| 7,237,081 B2 | 6/2007 | Dahan et al. | |
| 7,263,617 B2 | 8/2007 | Conti et al. | |
| 7,266,842 B2 | 9/2007 | Foster et al. | |
| 7,313,705 B2 | 12/2007 | Turkboylari | |
| 7,343,496 B1 | 3/2008 | Hsiang et al. | |
| 7,356,707 B2 | 4/2008 | Foster et al. | |
| 2007/0006150 A9 * | 1/2007 | Walmsley | ............ B41J 2/04505 717/120 |
| 2007/0174302 A1 * | 7/2007 | Ishiguro et al. | ................. 707/10 |
| 2007/0226795 A1 * | 9/2007 | Conti | ................... G06F 21/554 726/22 |

OTHER PUBLICATIONS

White, Ron, "How Computers Work", Millennium Ed., Que Corporation, Indianapolis, IN, 1999.*

* cited by examiner

*Primary Examiner* — Chrystina E Zelaskiewicz
(74) *Attorney, Agent, or Firm* — Middleton Reutlinger (57) ABSTRACT

A circuit arrangement, method, and design structure for controlling access to master secret data disposed in at least a portion of at least one persistent region of an integrated circuit device is disclosed. The circuit arrangement includes a clock circuit responsive to an external clock signal, a security state machine configured to control a security state of the integrated circuit device, and a master secret circuit in communication with the security state machine and configured to control access to the master secret data. The security state machine and master secret circuit are isolated from the clock circuit, and the master secret circuit is responsive to the security state machine to selectively erase at least a portion of the master secret data. The master secret circuit may be configured to erase the portion of the master secret data in response to a null or triggered security state.

24 Claims, 5 Drawing Sheets

| POSC Output | PORC Output | Control Shadow Register Advance | Tamper Event | Binary Output (B1:B0) | Current Security State | Next Binary Output (B1:B0) | Next Security State |
|---|---|---|---|---|---|---|---|
| 0 | DC | DC | DC | DM | DM | 10 | TRIGGERED |
| 1 | 1 | DC | DC | 10 | TRIGGERED | 00 | NULL |
| 1 | DC | 0 to 1 | DC | 00 | NULL | 01 | INITIALIZED |
| 1 | DC | 0 to 1 | DC | 01 | INITIALIZED | 11 | SECURED |
| 1 | DC | 0 to 1 | 0 | 11 | SECURED | 10 | TRIGGERED |
| 1 | DC | DC | 1 | 11 | SECURED | 10 | TRIGGERED |

FIG. 5

PROTECTING ISOLATED SECRET DATA OF INTEGRATED CIRCUIT DEVICES

FIELD OF THE INVENTION

The invention is generally related to computing systems, and more particularly to protecting secret data stored on integrated circuit devices in computing systems.

BACKGROUND OF THE INVENTION

Modern computing systems, whether personal or commercial, often include a secure section of memory devoted to master secret data, which generally contains initialization data, initialization settings, registry files, passwords, keys, and other sensitive information that is accessible to the components, applications, and operators of the computer on a limited basis. Master secret data is often used during booting, to encrypt/decrypt information, or for secure operations. As such, the master secret data is often among the most important of the data stored in computing systems as it allows the computing system to boot, secure information, read secured information, and generally operate.

In recent years, security of computing systems has become an increasingly important issue. Typically, operators of computing systems are concerned with the security of electronically stored information, including the master secret data, and prohibiting unauthorized access to it. Typical methods of gaining unauthorized access include loading viruses or worms on computing systems, loading software key-loggers or packet sniffers onto computing systems, attaching hardware-based key loggers onto computing systems, configuring packet sniffers on computer networks in communication with computing systems, and direct hardware attacks on computing systems. As such, there are a number of ways to attempt to gain unauthorized access to computing system data. However, as master secret data is especially integral to the operation of computing system, extra measures are typically used to prevent unauthorized access.

Recent developments to secure computing systems have generally included providing a security state machine to protect the master secret data of an integrated circuit. The security state machine is typically configured to protect the master secret data by preventing access to the master secret data in certain circumstances, such as when the computing system is turned off or when there is an indication that unauthorized access is being attempted. However, the security state machine is generally susceptible to hardware-based attacks while the computing system is running as well as when the computing system is powered off. In particular, typical security state machines are susceptible to clocking attacks that vary a clock circuit of the computing system, thus forcing the security state machine into erroneous states and leaving master secret data vulnerable. Moreover, master secret data is typically stored in a non-volatile region of memory of an integrated circuit. As such, integrated circuits configured with master secret data are susceptible to hardware attacks such as direct connection or de-layering attacks. Conventional direct connection attacks directly attach communication pins to areas of master secret data and capture that master secret data, while de-layering often includes removing at least one layer of an integrated circuit to directly read the memory locations of the master secret data and capture that master secret data. Thus, conventional security state machines typically leave integrated circuits vulnerable to hardware-based attacks and unauthorized access.

Consequently, there is a need for keeping master secret data safe during hardware-based attacks.

SUMMARY OF THE INVENTION

Embodiments of the invention provide a circuit arrangement, a method, and a design structure to control access to master secret data in an integrated circuit device by isolating a security state machine and master secret circuit from a clock circuit of the integrated circuit device. In this manner, the security state of the integrated device may be asynchronously controlled and master secret data stored in the master secret circuit may be asynchronously written and/or accessed, thus avoiding at least some deficiencies found in conventional circuit arrangements configured to protect master secret data.

Embodiments of the invention provide for a circuit arrangement for controlling access to master secret data, wherein the master secret data is disposed in at least a portion of at least one persistent region of an integrated circuit device. In some embodiments, the circuit arrangement includes a clock circuit responsive to an external clock signal, a security state machine configured to control a security state of the integrated circuit device, and a master secret circuit in communication with the security state machine and configured to control access to the master secret data by selectively erasing a portion of the master secret data. In those embodiments, the security state machine and the master secret circuit may be isolated from the clock circuit of the integrated circuit device. As such, the security state machine is configured to asynchronously change the security state of the integrated circuit device while the master secret circuit is configured to asynchronously erase the portion of master secret data. Thus, the security state machine and master secret circuit may be resistant to clocking attacks and embodiments of the circuit arrangement may be configured to inhibit access to master secret data during a clocking attack.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Embodiments of the invention provide a circuit arrangement, a method, and a design structure to control access to master secret data in an integrated circuit device.

Modern processing units, and in particular processing units disposed in a typical computing system, multi-processor computing system, shared memory computing system, and/or parallel computing system are typically comprised of a plurality of integrated circuits. These processing units, or integrated circuit devices, often store sensitive system information, or master secret data. This master secret data may include boot codes, master keys, file records, etc. that may be used to secure the system. As such, it is advantageous to protect master secret data from attempts to retrieve that data. However, some attempts to retrieve master secret data that utilize hardware based attacks are difficult to protect against. For example, clock based attacks to access master secret data are difficult to protect against, as clock circuits are used to provide pulses to the integrated circuit device that cause the integrated circuits of the integrated circuit device to perform at least one instruction. Furthermore, it is often desired to store master secret data in non-volatile region. As such, the non-volatile region may be de-layered to read data directly from the integrated circuit device.

Embodiments consistent with the invention provide a circuit arrangement, a method, and a design structure to control access to master secret data in an integrated circuit device by selectively erasing at least a portion of master secret data in response to a security state of the integrated circuit device. In particular, embodiments of the invention provide for a circuit arrangement for controlling access to master secret data, wherein the master secret data is disposed in at least a portion of at least one persistent region of an integrated circuit device. In some embodiments, the circuit arrangement includes a clock circuit responsive to an external clock signal, a security state machine configured to control a security state of the integrated circuit device, and a master secret circuit in communication with the security state machine and configured to control access to the master secret data by selectively erasing a portion of the master secret data. In those embodiments, the security state machine and the master secret circuit may be isolated from the clock circuit of the integrated circuit device. As such, the security state machine is configured to asynchronously change the security state of the integrated circuit device while the master secret circuit is configured to asynchronously erase the portion of master secret data. Thus, the security state machine and master secret circuit may be resistant to clocking attacks and embodiments of the circuit arrangement may be configured to inhibit access to master secret data during a clocking attack.

Furthermore, in some embodiments, the security state machine and the master secret circuit may be disposed in the at least one persistent region, which may be a battery-backed persistent region. As such, the security state machine and master secret circuit may be configured to operate when the remainder of the integrated circuit is powered off. Additionally, the master secret data may be erased in response to de-layering the integrated circuit device, which would necessarily interrupt a power signal to the at least one persistent region. In further specific embodiments, the at least one persistent region of the integrated circuit device may be isolated from the clock circuit.

In some embodiments, the security state machine is configured to reset the master secret circuit to selectively erase the portion of the master secret data. Furthermore, in some embodiments the circuit arrangement includes at least one shadow register in communication with the master secret circuit and configured to capture at least a portion of the master secret data from, and communicate at least a portion of new master secret data to, the master secret circuit. Moreover, at least one shadow register may be in communication with the security state machine and configured to advance the security state of the integrated circuit device. In those embodiments, advancing the security state of the integrated circuit device may include an advance selected from the group consisting of an advance from a null security state to an initialized security state, an advance from the initialized security state to a secured security state, an advance from the secured security state to a triggered security state, or an advance from the triggered security state to the null security state.

In some embodiments, the circuit arrangement includes a tamper event circuit to detect a tamper event of the integrated circuit device. In those embodiments, the security state machine is responsive to the tamper event circuit to change the security state of the integrated circuit device from a secured security state to a triggered security state in the event of the tamper event. In other embodiments, the circuit arrangement includes a power-on sense circuit in communication with the security state machine and configured to monitor a power signal to the at least one persistent region of the integrated circuit device. In those embodiments, the security state machine is responsive to the power-on sense circuit to attempt to change the security state of the integrated device from any security state to a triggered security state at any point when a power signal to the persistent region is not in a known sufficient good condition, and in specific embodiments the security state machine is responsive to change the security state of integrated circuit device to the triggered security state when the power signal is initially supplied to the at least one persistent region. In yet other embodiments, the circuit arrangement includes a power-on reset circuit in communication with the security state machine and configured to detect a reset of the integrated circuit device. In those embodiments, the security state machine is responsive to the power-on reset circuit to change the security state of the integrated circuit device from a triggered security state to a null security state in the event of the reset of the integrated circuit device.

In specific embodiments, the master secret circuit is responsive to a null security state and/or a triggered security state of the integrated circuit device to selectively erase at least a portion of the master secret data. In further specific embodiments, the master secret circuit is responsive to the null security state and/or the triggered security state of the integrated circuit device to selectively erase all the master secret data.

A processing unit, or a computing system, may include embodiments of the integrated circuit device.

Hardware and Software Environment

Figure 1:
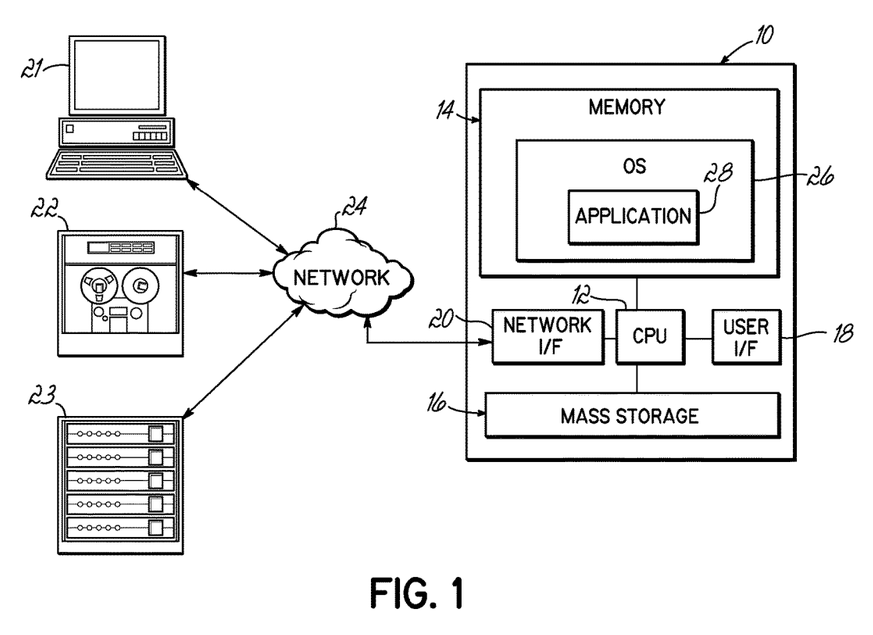
FIG. 1 is a block diagram of a computing system that may include an integrated circuit device with an asynchronously clocked master secret circuit consistent with embodiments of the invention.

Turning to the drawings, wherein like numbers denote like parts throughout the several views, FIG. 1 illustrates a hardware and software environment for a computing system 10 that may include an integrated circuit device (hereinafter, "ICD") consistent with embodiments of the invention. Computing system 10, for purposes of this invention, may represent any type of computer, computer system, computing system, server, disk array, or programmable device such as multi-user computers, single-user computers, handheld devices, networked devices, mobile phones, gaming systems, etc. Computing system 10 may be implemented using one or more networked computers, e.g., in a cluster or other distributed computing system. Computing system 10 will be referred to as "computer" for brevity sake, although it should be appreciated that the term "computing system" may also include other suitable programmable electronic devices consistent with embodiments of the invention.

Computer 10 typically includes at least one processing unit 12 (illustrated as "CPU") coupled to a memory 14 along with several different types of peripheral devices, e.g., a mass storage device 16, a user interface 18 (including, for example, user input devices and a display), and a network interface 20. The memory 14 may be comprised of dynamic random access memory (DRAM), static random access memory (SRAM), non-volatile random access memory (NVRAM), persistent memory, flash memory, and/or another digital storage medium. Mass storage device 16 may also be a digital storage medium, including at least one hard disk drive, and may be located externally to computer 10, such as in a separate enclosure or in one or more networked computers 21, one or more networked storage devices 22 (including, for example, a tape drive), and/or one or more other networked devices 23 (including, for example, a server). Computer 10 may communicate with the networked computer, networked storage device 22, and/or networked device 23 through a network 24. As illustrated in FIG. 1, computer 10 includes one processing unit 12, which, in various embodiments, may be a single-thread, multithreaded (e.g., a PowerPC microprocessor as distributed by International Business Machines ["IBM"] of Armonk, N.Y.), multi-core (e.g., an Opteron dual core processor as distributed by Advanced Micro Device, Inc. ["AMD"], of Sunnyvale, Calif.), and/or multi-element processing unit (e.g., a Cell Broadband Engine Architecture processor as jointly developed by IBM, Sony Computer Entertainment of Tokyo, Japan, and Toshiba of Tokyo, Japan) as is well known in the art. In alternative embodiments, computer 10 may include a plurality of processing units 12 that may include single-thread processing units, multithreaded processing units, multi-core processing units, multi-element processing units, and/or combinations thereof as is well known in the art. Similarly, memory 14 may include one or more levels of data, instruction and/or combination caches, with caches serving an individual processing unit or multiple processing units as is well known in the art. In some embodiments, Computer 10 may also be configured as a member of a distributed computing environment and communicate with other members of that distributed computing environment through network 24.

The memory 14 of the computer 10 may include an operating system 26 to control the primary operation of the computer 10 in a manner that is well known in the art. In a specific embodiment, the operating system 26 may be a Unix-like operating system, such as Linux. Memory 14 may also include at least one application 28, or other software program, configured to execute in combination with the operating system 26 and perform a task. Other operating systems may be used, such as Windows, MacOS, or Unix-based operating systems (e.g., for example, Red Hat, Debian, Debian GNU/Linux, etc.)

Figure 2:
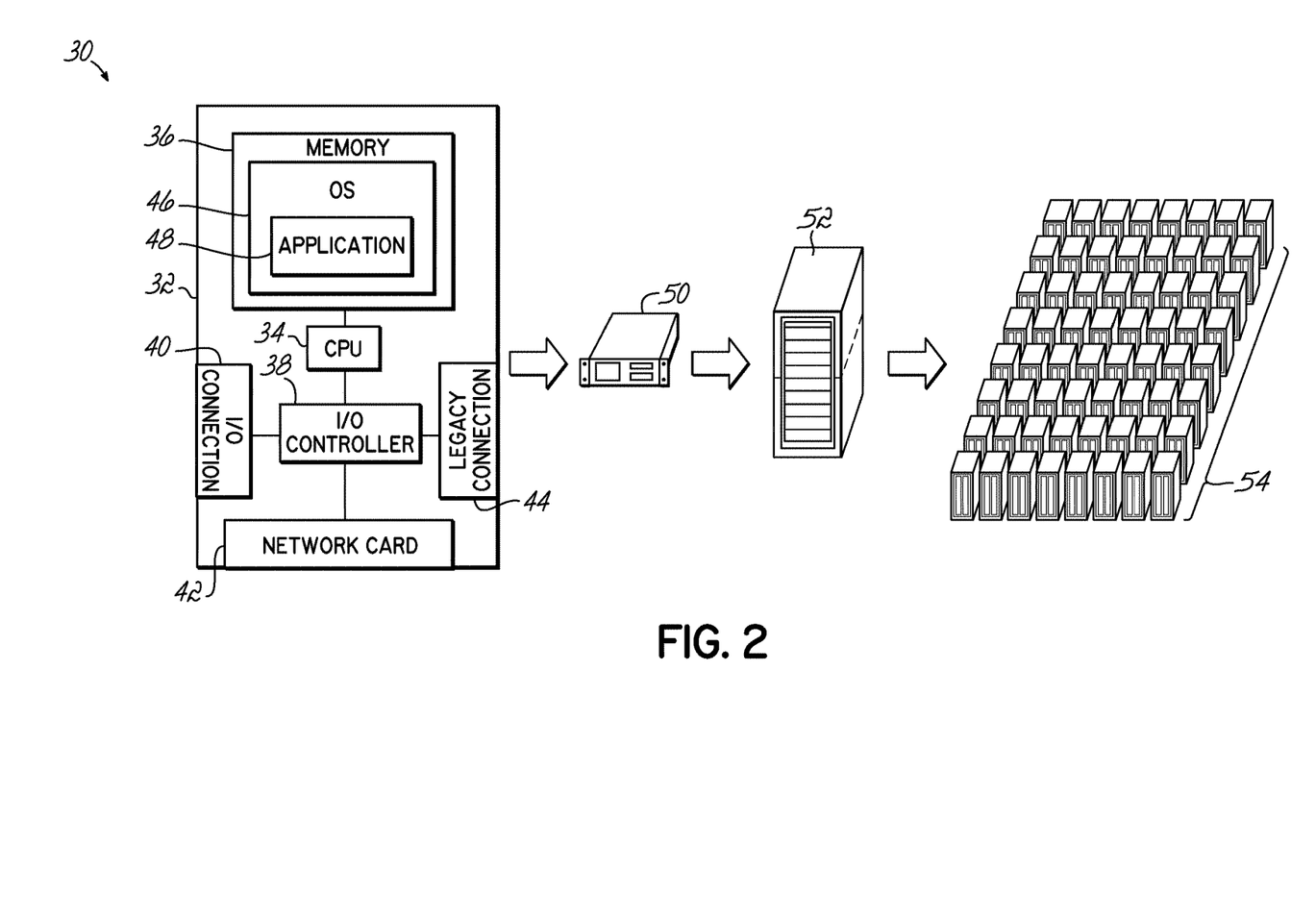
FIG. 2 is a block diagram of a parallel processing computing system that may include an integrated circuit device with an asynchronously clocked master secret circuit consistent with embodiments of the invention.

FIG. 2 is a diagrammatic illustration showing an alternative hardware and software environment for a parallel processing computing system 30 (hereinafter "system 30") that may include an integrated circuit device consistent with embodiments of the invention. The system 30 may include a plurality of nodes 32 that each include at least one processing unit 34 (illustrated as "CPU" 34) and a memory 36, which may include a local and/or remote cache memory. The memory 36 may be comprised of DRAM, SRAM, NVRAM, persistent memory, flash memory, and/or another digital storage medium. As illustrated in FIG. 2, system 30 includes one processing unit 34, which may be a single-thread, multithreaded, multi-core, and/or multi-element processing unit as is well known in the art. In alternative embodiments, system 30 may include a plurality of processing units 34 that may include single-thread processing units, multithreaded processing units, multi-core processing units, multi-element processing units, and/or combinations thereof as is well known in the art. Similarly, memory 36 may include one or more levels of data, instruction and/or combination caches, with caches serving an individual processing unit or multiple processing units as is well known in the art.

Each node 32 may further include an I/O controller 38 to control the communications between the processing unit 34 and at least one I/O connection 40, at least one network card 42, and at least one legacy connection 44. As such, each node 32 of the system 30 may be configured to communicate with other nodes, other components of the system 30 (such as storage resources or servers), and the system 30 through the I/O connection 40, network card 42, and/or legacy connection 44 as is well known in the art. Furthermore, each node 32 may include an operating system 46 and an application 48. The operating system 46 may be a simplified-function operating system configured to manage a workload and the application 48 as it processes a task of the workload. However, the operating system 46 may not, and advantageously does not, include certain functions normally associated with a typical personal computing operating system, including software, routines, components, or program code to support various I/O devices, error diagnostics and recovery, etc. As such, the operating system 46 may not include functionality present in operating system 26. In specific embodiments, the operating system 46 may include a simplified version of a Unix-like operating system, such as Linux. Other operating systems may be used, and it is not necessary that all nodes 32 employ the same operating system. As such, the application 48 may be a "multi-platform" application and operable to be installed across multiple and different operating systems or operating environments. Thus, the application 48 may be configured to communicate with other applications (e.g., other instances of the same application 48, or other applications configured to interoperate with application 48) through the network card 42. Local copies of data for each application 48, or data from each application 48, may be reserved in some portion of memory 36 in a file cache (not shown).

As illustrated in FIG. 2, at least one node 32 may be disposed into an enclosure 50, which may in turn be disposed in a cabinet 52. In some embodiments, each enclosure 50 may include a plurality of nodes 32, and in specific embodiments two nodes 32 may be mounted onto a node card (not shown), seventeen of which are disposed in the enclosure 52. In alternative embodiments, each enclosure may include heterogeneous combinations of nodes, such as a host node (not shown) that includes at least one multi-core processing unit and that is configured to control, send at least one task to, and manage, a plurality of accelerator nodes (not shown) that each include at least one multi-element processing unit to process the at least one task. The system 30 may include a plurality of cabinets 52 as shown at 54. Thus, the system 30 may include a scalable, cell-like architecture that can be replicated in a regular pattern to reduce bottlenecks as the system 30 is scaled up and configured to process a workload and at least one task in a parallel fashion.

In specific embodiments each node 32 may be configured to process a workload and/or one or more tasks, as well as cooperate with a plurality of other nodes 32 by communicating with those nodes through respective network cards 42 to process the workload and/or the one or more tasks in a parallel fashion as is well known in the art. Although one network card 42 is shown in FIG. 2, each node 32 may include a plurality of network cards 42 or other network connections. As such, each node 32 may be configured to communicate to the system 30 or other nodes 32 through various networks (not shown). For example, each node 32 may communicate to every other node 32 through a torus network (not shown). Moreover, various nodes 32 may be custom configured to perform various functions. As such, some nodes 32 of the system 30 may be configured as computing nodes (e.g., to receive a workload and/or at least one task and process that workload and/or at least one task), I/O nodes (e.g., to manage the communications to and/or from each compute node and the rest of the system 30), management nodes (e.g., to manage the system 30 and receive a workload and/or at least one task), and/or service nodes (e.g., to monitor the system 30, schedule a workload, and/or support the nodes 32). As such, and in some embodiments, the system 30 may have an architecture consistent with a BlueGene parallel computing system architecture as developed by IBM. In alternative embodiments, the system 30 may have an architecture consistent with a RoadRunner parallel computing system architecture as also developed by IBM. Moreover, and in further alternative embodiments, the system 40 may have an architecture consistent with a non-uniform memory access ("NUMA") and/or a cache coherent NUMA ("ccNUMA") computing system as is well known in the art. It will also be appreciated that nodes may be defined at a number of different levels in a multi-level shared memory architecture, and in some embodiments need not be distinguished from one another based upon any particular physical allocation or demarcation. Indeed, in some embodiments multiple nodes may be physically disposed in the same computer, on the same card, or even on the same integrated circuit.

In some embodiments, computer 10 and system 30 each include at least one ICD comprised primarily of integrated circuits as is well known in the art. In some embodiments, ICDs may include the processing units 12, 34 and/or other components of the computer 10 and system 30 that are comprised primarily of integrated circuits (such as, for example, memories 14, 36, etc.). In specific embodiments, the processing units 12, 34 are ICDs that further include at least one persistent region. Each persistent region is a region of an integrated circuit device that is configured to retain data in the event that power is no longer supplied to the remainder of the integrated circuit device. The persistent region may receive at least one power signal from a battery source to retain data and/or functionality, and thus the persistent region may be a battery-backed persistent store as is well known in the art. Thus, each processing unit 12, 34 may be configured to maintain data, such as master secret data, and/or at least some functionality in their respective non-volatile regions when the computer 10 and/or the system 30 is powered off.

Figure 3:
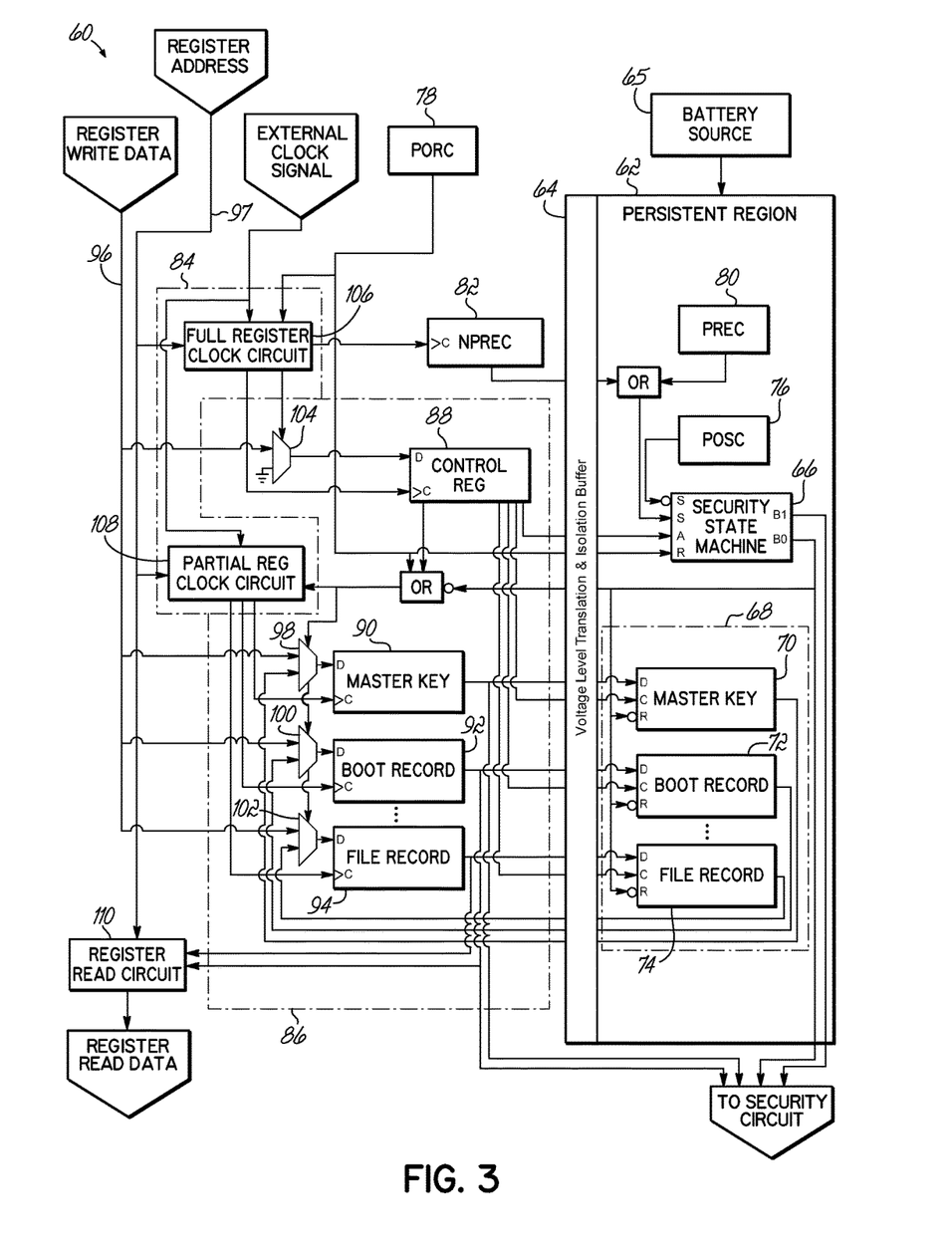
FIG. 3 is a schematic diagram of a circuit arrangement for an integrated circuit device with an asynchronously clocked master secret circuit and asynchronously clocked security state machine to protect master secret data consistent with embodiments of the invention.

FIG. 3 is a schematic illustration of at least a portion of an ICD 60 that includes at least one persistent region 62 consistent with embodiments of the invention. In some embodiments, the persistent region 62 is a region of the ICD 60 electrically isolated from the rest of the ICD 60 by a voltage level translation and isolation buffer 64. During normal operations, the persistent region 62 may be supplied power in much the same way as the rest of the ICD 60, but during a failure of power to the ICD 60 the persistent region 62 may be supplied power by a battery source 65. The voltage level translation and isolation buffer 64 is disposed between the persistent region 62 and the rest of the ICD 60 to electrically isolate the persistent region 62 from the ICD 60. The battery source 65 may be a rechargeable or non-rechargeable battery as is well known in the art, and the battery source 65 may be disposed on, or external to, the ICD 60 as is also well known in the art. In some embodiments, the battery source 65 is a rechargeable battery source that charges and powers the persistent region 62 when there is power to the ICD 60, and discharges to the persistent region 62 when the ICD 62 does not receive power. As such, the persistent region 62 may, in specific embodiments, be a battery-backed persistent store. Although only one persistent region 62 is illustrated in FIG. 3, the ICD 60 may include a plurality of persistent regions 62 that may each be electrically isolated from the rest of the ICD 60. However, and not intending to be limiting, disclosure consistent with embodiments of the invention will refer to a persistent region 62 and one having ordinary skill in the art will appreciate that the ICD 60 may include additional persistent regions without departing from the scope of the invention.

The persistent region 62 includes at least one security state machine 66 in communication with at least one master secret circuit 68 configured to store at least a portion of master secret data. The security state machine 66, in some embodiments, is responsive to a plurality of inputs or input signals and configured to control a security state of the ICD 60, which in turn controls the operating characteristics of the ICD 60. In specific embodiments, the security state machine 66 outputs a two-bit Gray code counter to indicate and control the security state of the ICD 60. Table 1 shows the output of the security state machine 66 and the resulting security state of the ICD 60 from that output.

TABLE 1

Gray Code Output of the Security State Machine

| Binary Output (B1:B0) | Security State | Bits Changed from Previous Output |
|---|---|---|
| 00 | NULL | |
| 01 | INITIALIZED | One |
| 11 | SECURED | One |
| 10 | TRIGGERED | One |
| 00 | NULL | One |

Advantageously, by configuring the output of the security state machine 66 as a two-bit Gray code counter (e.g., most significant output bit B1 and least significant output bit B0), each state transition only requires the adjustment of one bit and is believed to prevent the ICD 60 from temporarily appearing in an erroneous state. For example, because only one bit of the output of the security state machine 66 (e.g., one bit of the Gray code counter) changes between state transitions, there are only two possible states in which a particular state transition can proceed. Advantageously, this is believed to prevent transitory transitions between states. For example, when two bits of the output of the security state machine 66 change between state transitions, there may be a transitory period when one bit is changed but the other is not. As such, an ICD 60 may temporarily transition to an undesired state before finally transitioning to a desired state, and thus the master secret data may be susceptible to attack. To further illustrate state transitions, Table 2 shows a two-bit binary output, resulting security state of an ICD from that output, as well as the number of bits that are changed from a previous security state.

TABLE 2

Non-Gray Code Output and Bit Changes

| Binary Output (B1:B0) | Security State | Bits Changed from Previous Output |
|---|---|---|
| 00 | NULL | |
| 01 | INITIALIZED | One |
| 10 | SECURED | Two |
| 11 | TRIGGERED | One |
| 00 | NULL | Two |

As shown in Table 2, when the state of an ICD transitions from an INITIALIZED state ("01") to a SECURED state ("10"), an ICD may erroneously enter a NULL state ("00") if a security state machine temporarily decrements the second bit before incrementing the first bit. Similarly, an ICD may erroneously enter a TRIGGERED state ("11") if a security state machine temporarily increments the first bit before decrementing the second bit. Similar deficiencies may be present when the state of an ICD transitions from the TRIGGERED state ("11") to the NULL state ("00"). In some embodiments of the invention, and again with reference to FIG. 3 and Table 1, the security state machine 66 of the ICD 60 outputs a two-bit Gray code counter that indicates and controls the security state of the ICD 60 to avoid temporary state transitions that may occur with a conventional two-bit output counter. In alternative embodiments of the invention, the security state machine 66 of the ICD 60 may output a Gray code counter to indicate and control the security state of the ICD 60 that includes more than two bits, such as a three-bit or four-bit Gray code counter as is well known in the art.

In addition to controlling the security state of the ICD 60, the security state machine 66 may be configured to control access to the master secret data of the master secret circuit 68. The master secret circuit 68 is responsive to the security state machine 66 to selectively erase at least a portion of the master secret data in response to the security state machine 66 changing the security state of the ICD 60 to the NULL state or the TRIGGERED state. In some embodiments, the master secret circuit 68 includes a plurality of master secret data circuits 70, 72, and 74 configured to store portions of master secret data, and may include a master key master secret data circuit 70, a boot record master secret data circuit 72, and a file record master secret data circuit 74 to store respective master key data, boot record data, and file record data of the master secret data. Although three master secret data circuits 70, 72, and 74 are illustrated, and although master secret data may include master key data, boot record data, and file record data, additional master secret data circuits may store additional master secret data without departing from the scope of the invention. As such, embodiments of the invention should not be limited to just the master key master secret data circuit 70, boot record master secret data circuit 72, and file record master secret data circuit 74 to store respective master key data, boot record data, and file record data of the master secret data.

Upon a power signal being initially supplied to the persistent region 62, it may be desired to have the security state of the ICD 60 be a TRIGGERED state to prevent access to master secret data (e.g., to prevent master secret data from being written). As such, the security state machine 66 may be in communication with at least one power-on sense circuit 76 (illustrated as, and hereinafter, "POSC" 76) to determine when a power signal (not shown), which may be a power signal from the battery source 65, is initially supplied to the persistent region 62. In some embodiments, the POSC 76 may be configured to determine when the power signal to the persistent region 62 is in a known good condition, and in specific embodiments the POSC 76 may be configured to determine when the power signal to the persistent region 62 has reached a sufficient initial level. The security state machine 66 may be responsive to the POSC 76 to change the security state of the ICD 60 to the TRIGGERED state. Thus, and in some embodiments, the POSC 76 detects the initial power to the persistent region 60, thus preventing erroneous and/or malicious access to master secret data.

The ICD 60 may also include a power-on reset circuit 78 (illustrated as, and hereinafter, "PORC" 78) in communication with the security state machine 66 and configured to indicate a reset of the ICD 60 to the security state machine 66. As such, the PORC 78 may monitor the power to the ICD 60 (as opposed to the POSC 76, which may monitor the power to the persistent region 62) and/or the PORC 78 may monitor a switch (not shown) and/or a pushbutton (not shown) to detect an interruption of power (e.g., power to the ICD 60) and/or a signal (e.g., from the switch and/or pushbutton) that may, in turn, indicate a reset of the ICD 60. As such, the security state machine 66 may be responsive to the PORC 78 to change the security state of the ICD 60 from the TRIGGERED state to the NULL state when a reset of the ICD 60 is detected. In a specific embodiment, the only way to transition the security state of the ICD 60 from the TRIGGERED state to the NULL state is to reset the ICD 60 and thus trigger the PORC 78.

To detect a tamper event, the security state machine 66 may be in communication with at least one persistent region event circuit 80 (illustrated as, and hereinafter, "PREC" 80) and at least one non-persistent region event circuit 82 (illustrated as, and hereinafter, "NPREC" 82). The PREC 80 and the NPREC 82 are configured to indicate a tamper event of the ICD 60, a component of the ICD 60, the persistent region 62, and/or a component of the persistent region 62 as is well known in the art. In some embodiments, the PREC 80 and/or the NPREC 82 are configured to detect a variance of a clock circuit 84 of the ICD 60 that may indicate a clocking attack on the ICD 60, and thus indicate an attempt to maliciously retrieve master secret data from the master secret circuit 68. Thus, a tamper event, whether indicated by the PREC 80 or the NPREC 82, may cause the security state machine 66 to change the security state of the ICD 60. As illustrated in FIG. 3, at least one output of each of the PREC 80 and NPREC 82 are combined (e.g., the at least one output of each of the PREC 80 and NPREC 82 are logically OR'd) and provided to the security state machine 66. In the event that a tamper event is detected, the security state machine 66 is configured to change the security state of the ICD 60 from a SECURED state to the TRIGGERED state. The PREC 80 and/or the NPREC 82, whether taken alone or in combination, may thus be considered a "tamper event circuit" configured to indicate a tamper event to the security state machine 66.

As illustrated in FIG. 3, the security state machine 66, the master secret circuit 68, the POSC 76, and the PREC 80 are disposed within the persistent region 62 of the ICD 60. In some embodiments, the persistent region 62 is not only electrically isolated from the ICD 60 by the voltage level translation and isolation buffer 64, but is additionally isolated from the clock circuit 84 of the ICD 60. As such, at least a portion of the persistent region 62, including the security state machine 66, the master secret circuit 68, the POSC 76, and/or the PREC 80, are configured to operate asynchronously and without reference to the clock circuit 84 of the ICD 60.

The ICD 60 may further include at least one shadow register 86 to communicate with the security state machine 66 to advance the security state of the ICD 60, as well as capture at least a portion of the master secret data from, and communicate at least a portion of the master secret data to, the master secret circuit 68. In some embodiments, the ICD 60 may include a plurality of shadow registers 88, 90, 92, and 94. In those embodiments, the ICD 60 may include a control shadow register 88 in communication with the security state machine 66 to advance the security state of the ICD 62 (for example, from the NULL to INITIALIZED state, from the INITIALIZED to SECURED state, and/or from the SECURED to TRIGGERED state). The control shadow register 88 may also be in communication with the master secret circuit 68 to selectively commit data from at least one of the master key shadow register 90, boot record shadow register 92, and/or file record shadow register 94 to the respective master key master secret data circuit 70, boot record master secret data circuit 72, and/or file record master secret data circuit 74 of the master secret circuit 68. In turn, the shadow registers 90, 92, and 94 may be configured to receive at least a portion of master secret data from the ICD 60 through a register write data bus 96.

In some embodiments, the register write data bus 96 is configured to provide at least one of the shadow registers 90, 92, and/or 94 with a respective at least a portion of master secret data to send to the respective master secret data circuits 70, 72, and/or 74. Additionally, the ICD 60 may communicate to the control shadow register 88 through the register write data bus 96, and in some embodiments the IC 60 may communicate an indication of which shadow registers 90, 92, and/or 94 to selectively commit at least a portion of master secret data.

The master key shadow register 90, boot record shadow register 92, and file record shadow register 94 are in respective communication with the master key master secret data circuit 70, boot record master secret data circuit 72, and file record master secret data circuit 74. In some embodiments, the master key shadow register 90, boot record shadow register 92, and file record shadow register 94 may receive at least a portion of respective master secret data from the respective master key master secret data circuit 70, boot record master secret data circuit 72, file record master secret data circuit 74, and/or from the register data bus 96. Whether the shadow registers 90, 92, and 94 receive data from the register data bus 96, from the master secret circuit 68, or from additional master secret data circuits (not shown) as determined by the specific implementation of the ICD 60 (e.g., from additional persistent regions), is determined by at least one signal to the respective multiplexers 98, 100 and 102. In this manner, the master key shadow register 90, boot record shadow register 92, and/or file record shadow register 94 may each be configured to capture at least a portion of the master secret data from, and communicate at least a portion of new master secret data to, the respective master secret data circuits 70, 72, and 74. As illustrated in FIG. 3, the ICD 60 includes one persistent region 62. In alternative embodiments, the ICD 60 may include a plurality of persistent regions 62, each selectively communicating with the shadow registers 90, 92, and/or 94. In that alternative embodiment, the respective multiplexers 98, 100, and/or 102 may determine which persistent region 62 and at least portions of master secret data thereof are selected to be communicated to the shadow registers 90, 92, and/or 94.

The control shadow register 88 is in communication with the register data bus 96 through multiplexer 104 to receive commands to selectively commit at least a portion of the master secret data from at least one shadow register 90, 92, and/or 94 to the respective master key data circuits 70, 72, and/or 74, as well as to receive commands to advance the security state of the ICD 60.

The ICD 60 includes a clock circuit 84 responsive to an external clock signal and the register address bus 97, the clock circuit 84 further in communication with the shadow register 86, PORC 78, and/or NPREC 82. In specific embodiments, the clock circuit 84 is comprised of a full register clock circuit 106 and a partial register clock circuit 108. The full register clock circuit 106 may be in communication with the PORC 78, the NPREC 82, the control shadow register 88, the register address bus 97, and/or the multiplexer 104. Thus, the full register clock circuit 106 may be responsive to the external clock signal, the PORC 78, and/or data from the register address bus 97 to control the clocking for the NPREC 82, the control shadow register 88, and/or the data received by the control shadow register 88 through multiplexer 104. The partial register clock circuit 108 may be in communication with the external clock circuit, the register address bus 97, and/or a combination of the outputs of the security state machine, shadow control register, and/or the PORC 78 to selectively control the clock signal to at least one of the master key shadow register 90, the boot record shadow register 92, and/or the file record shadow register 94. Thus, in specific embodiments, the partial register clock circuit 108 is selectively controlled to provide a clock signal to at least one shadow register 90, 92, and/or 94.

The security state machine 66 is in communication with the POSC 76, the PORC 78, the PREC 80, the NPREC 82, and the control shadow register 88. In specific embodiments, the input to the security state machine 66 from the POSC 76 is inverted, while inputs that connect to the PORC 78, the PREC 80, the NPREC 82, and the control shadow register 88 are not inverted. The master key master secret data circuit 70, the boot record master secret data circuit 72, and the file record master secret data circuit 74 are in communication with the respective master key shadow register 90, the boot record shadow register 92, and the file record shadow register 94. In some embodiments, each master secret data circuit 70, 72, and 74 is configured to receive from about four up to about 512 bits from each of the respective shadow registers 90, 92, and 94. In those embodiments, each of the master secret data circuits 70, 72, and 74 may include a plurality of slave latches corresponding to the number of bits from the respective shadow registers 90, 92, and 94 that are each selectively loadable by the control shadow register 88. In alternative embodiments, each of the master secret data circuits 70, 72, and 74 may include more slave latches than there are bits from the respective shadow registers 90, 92, and 94 such that the slave latches of the respective master secret data circuits 70, 72, and/or 74 are addressable by the respective shadow registers 90, 92, 94. In those alternative embodiments, each master secret data circuit 70, 72, and 74 is configured to hold more data than can be input by the respective shadow registers 90, 92, and 94 during one commit of data. As illustrated in FIG. 3, each master secret data circuit 70, 72, and 74 is in communication with the control shadow register 88, which is configured to commit data from the respective shadow registers 90, 92, and 94. Furthermore, each master secret data circuit 70, 72, and 74 is further in communication with the security state machine 66 such that each master secret data circuit 70, 72, and 74 inverts at least one signal from the security state machine 66. Thus, in the event that the signal from the security state machine 66 to at least one master secret data circuit 70, 72, and/or 74 is a logic low (e.g., a logic high as received by the master secret data circuit 70, 72, and/or 74), that master secret data circuit 70, 72, and/or 74 is reset, thereby erasing respective master secret data. Each master secret data circuit 70, 72, and 74 is configured to feed back master secret data to the respective shadow register 90, 92, or 94. As such, the shadow registers 90, 92, and 94 may receive at least a portion of master secret data from the register write data bus 96 or from the respective master secret data circuits 70, 72, and 74, or from other respective master secret data circuits (not shown). Data from the shadow registers 90, 92, and/or 94 may be read by a register read circuit 110, which may in turn be controlled to provide at least a portion of the data from at least one of the shadow registers 90, 92, and/or 94 to the ICD 60. In some embodiments, the register read circuit 110 is controlled by the register address bus 97 to selectively receive data from the boot record shadow register 92 and/or the file record shadow register 94. In some alternative embodiments (not shown), the register read circuit 110 may additional be controlled by the register address bus 97 to selectively receive data from the master key shadow register 90. The register read circuit 110 may be in communication with another component of the ICD 60 that may be configured to receive the respective data from the master key shadow register 90 (not shown), the boot record shadow register 92 and/or the file record shadow register 94.

In some embodiments, and as previously discussed, the security state machine 66 includes at least two output bits (e.g., the most significant bit labeled "B1" and the least significant bit labeled "B0") that operate as Gray code counter outputs. At least one of these bits (e.g., in the embodiment illustrated in FIG. 3, B0) is in communication with the master secret data circuits 70, 72, and 74. As such, this at least one bit from the security state machine 66 is configured to selectively erase the master secret data in at least one of the master secret data circuits 70, 72, and 74. In specific embodiments, the at least one bit from the security state machine 66 is configured to be logic low during the NULL and TRIGGERED state, and as such erase the master secret data. This, in turn, results in the feedback from the master secret data circuits 70, 72, and 74 to the respective shadow registers 90, 92, and 94 to be erased, and therefore causes data read from the register read circuit 110 to be invalid (e.g., the data read from the register read circuit 110 is zeroed, or otherwise all logic low). In some embodiments, the at least two output bits of the security state machine 66 lead to at least one security circuit (not shown) of the ICD 60. The security circuit may control operating characteristics of the ICD 60 during security states that are not otherwise controlled by the security state machine 66, such as preventing applications from loading during the INITIALIZED state, shutting off network communications during a TRIGGERED state, preventing I/O reads during a TRIGGERED state, and other operating characteristics associated with other security states.

In some embodiments, the input to multiplexers 98, 100 and 102 are controlled by a combination (e.g., a logical OR) of at least one output of the security state machine 66 subsequently inverted (e.g., in the embodiments illustrated in FIG. 3, an inversion of B0), the output from the PORC 78, and at least one output from the control shadow register 88. As such, the multiplexers 98, 100, and/or 102 may be configured to provide data from the register write data bus 96 to the respective shadow registers 90, 92, and/or 94 when the combination from the logical OR is a low logic signal, such as when the security state machine 66 is in the INITIALIZED or SECURED states. Additionally, the combination from the logical OR may be the low logic signal when there is not a reset of the ICD 60 and when the control shadow register 88 was not controlled by the register write data bus 96 to select the feedback from the master secret data circuits 70, 72, and/or 74. In specific embodiments, when the combination from the logical OR is a high logic signal, such as when the security state machine 66 is in the NULL or TRIGGERED states, the multiplexers 98, 100, and/or 102 be configured to provide data from the feedback of the respective master secret data circuits 70, 72, and/or 74 to the respective shadow registers 90, 92, and/or 94.

In some embodiments, the input to the multiplexer 104 is controlled by the full register clock circuit 106. In the event that multiplexer 104 receives a logic low from the full register clock circuit 106, the control shadow register 88 will receive data from the register write data bus 96. This data may include at least one command to advance the security state machine 66, selectively erase at least a portion of the master secret data in the master secret circuit 68, and/or control the multiplexers 98, 100 and 102. In the event that the multiplexer 104 receives a logic high from the full register clock circuit 106, the control shadow register 88 will receive only logic low signals from an electrical ground in communication with the multiplexer 104. In some embodiments, the full register clock circuit 106 is in communication with the PORC 78 to control the multiplexer 104, and thus the full register clock circuit 106 may output a logic low value to the multiplexer 104 in the event of a reset of the ICD 60.

Figure 4:
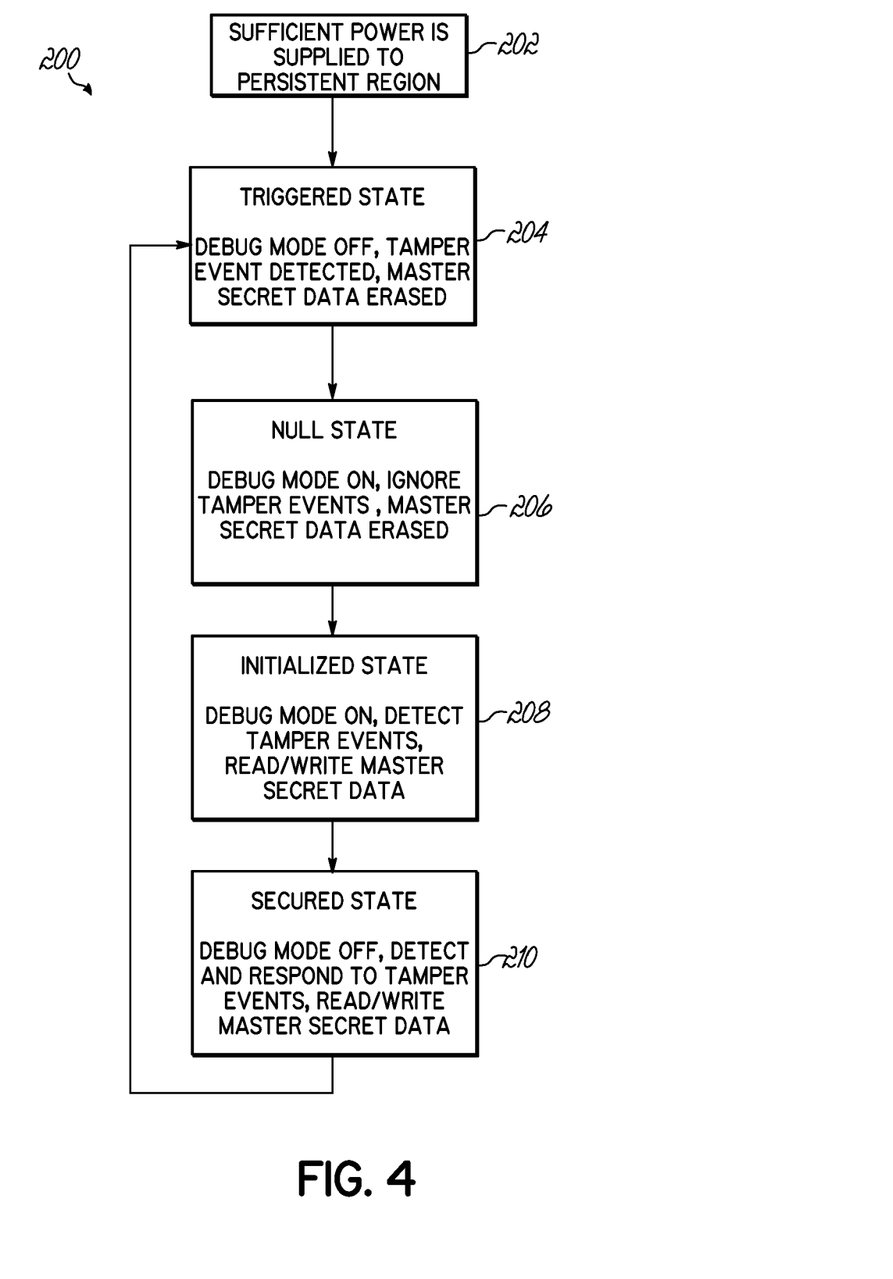
FIG. 4 is a flowchart illustrating the security state transitions of the circuit arrangement of FIG. 3 consistent with embodiments of the invention.

FIG. 4 is a diagrammatic illustration 200 of one embodiment of the security states and the transitions thereof, as well as some general operating characteristics of the ICD 60 in those security states, consistent with embodiments of the invention. In some embodiments, the transitions of the security states begin by determining whether there is appropriate initial power supplied to the persistent region 62 from a power signal (block 202). In specific embodiments, the POSC 76 may determine whether there is appropriate initial power and the security state machine 66 may transition to the TRIGGERED state (block 204). In specific embodiments, when in the TRIGGERED state, the master secret circuit 68 is placed in a reset and the master secret data is erased and the DEBUG mode of the ICD 60 is disabled.

From the TRIGGERED state, the only way to proceed to a NULL state (block 206) is upon detection of a reset of the ICD 60, such as may be detected by the PORC 78. Thus, malicious state advance commands from the ICD 60 and/or from software may be prevented, as a physical reset of the ICD 60 is required. In specific embodiments, when in the NULL state, the master secret circuit 68 is placed in a reset and the master secret data is erased, a DEBUG mode of the ICD 60 is enabled, and/or the security state machine 66 ignores any tamper events. In some embodiments, the DEBUG mode enables debug logic, addressable backdoors, and/or test logic that is typically used to facilitate ICD development and/or ICD testing.

From the NULL state, the ICD 60 may transition to the INITIALIZED state (block 208). The INITIALIZED state may be entered into in response to a state advance command from the ICD 60 and/or software. As such, and in one example, the INITIALIZED state may be entered when a computer 10 or node 32 in which the ICD 60 is disposed has been powered and is read to be booted. In specific embodiments, when in the INITIALIZED state, the master secret circuit 68 is no longer in a reset and master secret data may be written or read from that master secret circuit 68, the DEBUG mode of the ICD 60 is enabled, and/or the security state machine 66 is not responsive to any tamper events.

From the INITIALIZED state, the ICD 60 may transition to the SECURED state (block 210). The SECURED state may be entered into after an initialization process of the ICD 60 has completed. As such, and in one example, the SECURED state may be entered into when the computer 10 or node 32 in which the ICD 60 is disposed has finished initialization and is ready for secured operations, such as in secured and/or conventional operating modes. In specific embodiments, when in the SECURED state, the master secret circuit is no longer in a reset and master secret data may be written or read from that master secret circuit 68, the DEBUG mode of the ICD 60 is disabled, and/or the security state machine 66 is responsive to tamper events.

From the SECURED state, the ICD 60 may transition back to the TRIGGERED state (block 202). The TRIGGERED state may be entered into after a tamper event while the ICD 60 is in the SECURED state and/or in response to ICD 60 control signals while the ICD 60 is in the SECURED state. As such, and in one example, the TRIGGERED state may be entered into when the clock circuit 84 of the ICD 60 is being tampered with. As such, and in another example, the TRIGGERED state may be entered into when the security state machine 66 is advanced to that state in response to a state advance command from the ICD 60. In specific embodiments, when in the TRIGGERED state, the master secret circuit 68 is placed in a reset and the master secret data is erased, the DEBUG mode of the ICD 60 is disabled, the security state machine 66 has detected a tamper event, and/or the security state machine 66 has been advanced to the TRIGGERED state by the ICD 60.

Although not illustrated, additional operating characteristics of the ICD 60 may be dependent upon the security states. For example, and in some embodiments, the security state machine 66 may be used for encryption and/or decryption operations, access table translations, and/or to control access to substitute boot records as is well known in the art, and the execution of those additional functions may be dependent upon one or more security states of the ICD 60.

Figure 5:
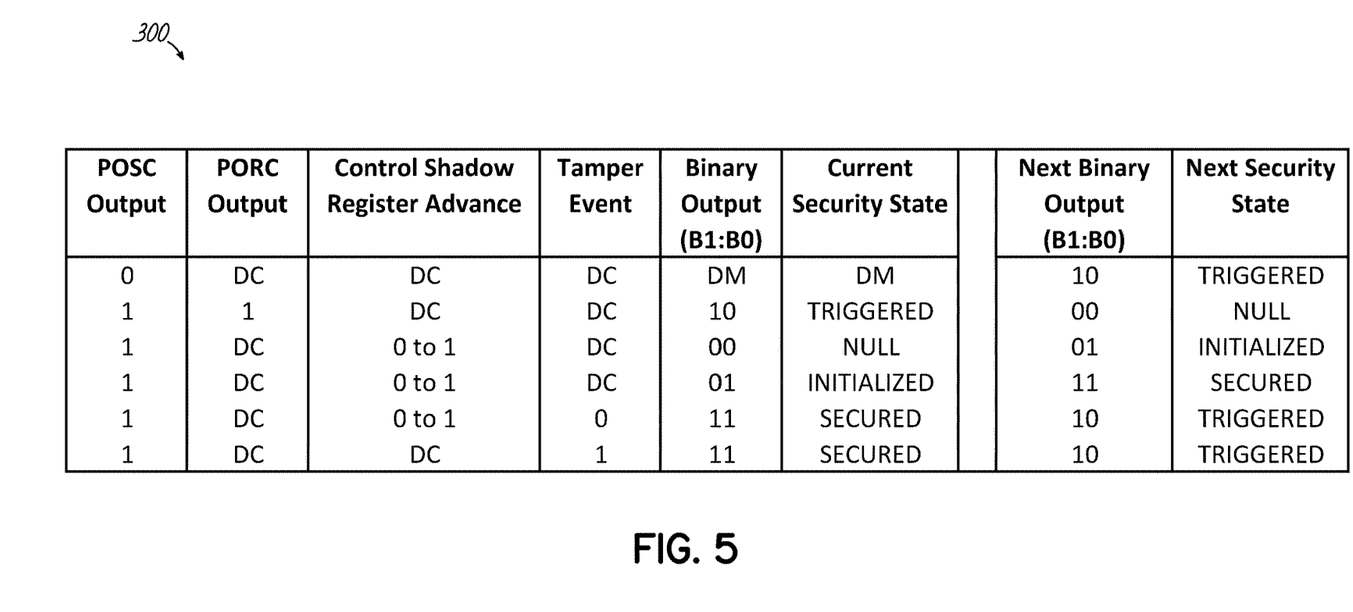
FIG. 5 is a table illustrating security state transitions in response to inputs from power circuits, event circuits, and other components of the circuit arrangement of FIG. 3, as well as the binary outputs of a security state machine of the circuit arrangement both before and after the transitions, consistent with embodiments of the invention.

FIG. 5 is a table illustrating one embodiment 300 of the outputs of the security state machine 66 in response to signals from the POSC 76, PORC 78, PREC 80, NPREC 82, and control shadow register 88, as well as their effect on the next security state of the ICD 60. In the event that the security state machine 66 does not care about an input, tamper event, or security state, that input, tamper event, or security state is marked with "DC" ("Don't Care") or "DM" ("Doesn't Matter").

With reference to FIG. 5, the security state machine 66 may be responsive to the POSC 76 to change the security state of the ICD 60 to the TRIGGERED state despite the inputs from the PORC 78, the PREC 80, the NPREC 82, the control shadow register 88, and the current security state. Similarly, the security state machine 66 may be responsive to the PORC 78 to change the security state of the ICD 60 to the NULL state from the TRIGGERED state despite the inputs from the PREC 80, the NPREC 82, and the control shadow register 88. Moreover, the security state machine 66 may be responsive to the control shadow register 88 to advance the security state of the ICD 60 from the NULL state to the INITIALIZED state and from the INITIALIZED state to the SECURED state despite the inputs from the PORC 78, the PREC 80, and the NPREC 82. The security state machine 66 may also be responsive to the control shadow register 88 to advance the security state of the ICD 60 from the SECURED state to the TRIGGERED state when the inputs from the PREC 80 and NPREC 82 indicate no tamper event and despite the input from the PORC 78. Additionally, the security state machine 66 may be responsive to the PREC 80 and/or NPREC 82 to advance the security state of the ICD 60 from the SECURED state to the TRIGGERED state despite inputs from the PORC 78 and the control shadow register 88.

Thus, embodiments of the invention provide for a circuit arrangement isolated from a clock circuit of an ICD to control the security state of that ICD and selectively erase at least a portion of master secret data in response to changing the security state of the ICD to a NULL or TRIGGERED state.

Consistent with embodiments of the present invention, circuit arrangements may be implemented as generic gate netlists, as complete special purpose or general purpose microprocessors, or in other ways as may occur to those of skill in the art. A netlist is a Boolean-algebra representation (gates, standard cells) of an circuit arrangement's logical-function, analogous to an assembly-code listing for a high-level program application. Circuit arrangements also may be implemented, for example, in synthesizable form, described in a hardware description language such as Verilog or VHDL. In addition to netlist and synthesizable implementation, circuit arrangements also may be delivered in lower-level, physical descriptions. Circuit arrangement elements may be distributed in a transistor-layout format such as GDSII. Digital elements of circuit arrangements are sometimes offered in layout format as well. It will also be appreciated that circuit arrangements, as well as other logic circuitry implemented consistent with the invention may be distributed in the form of computer data files, e.g., logic definition program code or design structures, that define at various levels of detail the functionality and/or layout of the circuit arrangements implementing such logic. Thus, while the invention has been described in the context of circuit arrangements implemented in fully functioning integrated circuit devices and computers and systems utilizing such devices, those of ordinary skill in the art having the benefit of the instant disclosure will appreciate that circuit arrangements consistent with the invention are capable of being distributed as program products or design structures in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Those skilled in the art will recognize that the environments illustrated in FIGS. 1-5 are not intended to limit the present invention. Various modifications may be made to the illustrated embodiments without departing from the spirit and scope of the invention. For example, other alternative hardware environments may be used without departing from the scope of the invention. Thus, the master secret circuit may include more or fewer output bits, and that in such an embodiment the master secret circuit may selectively erase only a portion of the master secret data without departing from the scope of the invention. In one specific embodiment, the output of the security state machine is a four-bit counter such that one bit controls erasure of the master key, one bit controls erasure of the boot record, and one bit controls erasure of the file record in the master secret circuit. As such, the output of the security state machine may not be configured to be a Gray code counter, but rather the output of the security state machine may be configured as a bit-shifting counter as is well known in the art. Similarly, logic may be disposed between the security state machine and master secret circuit and that logic may be responsive to the ICD to selectively erase at least a portion of the master secret data in various security states without departing from the scope of the invention. Furthermore, one having ordinary skill in the art will appreciate that the external clock signal is merely external to the clock circuit, and thus may be disposed within the ICD or otherwise in communication with the ICD as is well known in the art.

Other modifications will be apparent to one of ordinary skill in the art. Therefore, the invention lies in the claims hereinafter appended.

What is claimed is:

1. An integrated circuit device including a circuit arrangement for controlling access to master secret data disposed in at least a portion of at least one persistent region of the integrated circuit device, the circuit arrangement comprising:
    a clock circuit being responsive to an external clock signal;
    a security state machine including logic configured to control a security state of the integrated circuit device, wherein the security state machine includes logic to advance between at least three security states and is electrically isolated and additionally isolated from the clock circuit of the integrated circuit device to operate asynchronously and without reference to the clock circuit;
    a master secret circuit in communication with the security state machine and including logic to control access to the master secret data, wherein the master secret circuit is electrically isolated and additionally isolated from the clock circuit of the integrated circuit device to operate asynchronously and without reference to the clock circuit, and wherein the master secret circuit is responsive to the security state machine to erase at least a portion of the master secret data; and
    a power-on sense circuit in communication with the security state machine and including logic to monitor a power signal to the at least one persistent region of the integrated circuit device and to determine when the power signal is initially supplied to the at least one persistent region of the integrated circuit device, wherein the security state machine is responsive to the power-on sense circuit to erase at least a portion of the master secret data in response to the power-on sense circuit determining that the power signal is being initially supplied to the at least one persistent region.

2. The integrated circuit device of claim 1, wherein the security state machine outputs a gray code representative of a security state of the security state machine and is configured to reset the master secret circuit to erase the portion of the master secret data.

3. The integrated circuit device of claim 1, further comprising:
    at least one shadow register in communication with the master secret circuit and configured to capture master secret data from, and communicate new master secret data to, the master secret circuit.

4. The integrated circuit device circuit arrangement of claim 1, further comprising:
    at least one shadow register in communication with the security state machine and configured to advance the security state of the integrated circuit device.

5. The integrated circuit device of claim 4, wherein the at least one shadow register is configured to:
    advance the security state machine to an initialized security state when the security state machine is in a null security state;
    advance the security state machine to a secured security state when the security state machine is in the initialized security state; and
    advance the security state machine to a triggered security state when the security state machine is in the secured security state.

6. The integrated circuit device of claim 1, further comprising:
    a tamper event circuit in communication with the security state machine and configured to detect a tamper event of the integrated circuit device, wherein the security state machine is responsive to the tamper event circuit to advance the security state of the integrated circuit device from a secured security state to a triggered security state in the event of the tamper event.

7. The integrated circuit device of claim 1, wherein the security state machine is responsive to the power-on sense circuit to advance the security state of the integrated device to a triggered security state in response to the power-on sense circuit determining that the power signal is being initially supplied to the at least one persistent region.

8. The integrated circuit device of claim 1, further comprising:
    a power-on reset circuit in communication with the security state machine and configured to detect a reset of the integrated circuit device, wherein the security state machine is responsive to the power-on reset circuit to advance the security state of the integrated circuit device from a triggered security state to a null security state in the event of the reset of the integrated circuit device.

9. The integrated circuit device of claim 1, wherein the security state machine is configured to reset the master secret circuit to erase the portion of the master secret data in response to advancing the security state of the integrated circuit device to a triggered security state.

10. The integrated circuit device of claim 1, wherein the security state machine is configured to reset the master secret circuit to erase the portion of the master secret data in response to advancing the security state of the integrated circuit device to a null security state.

11. The integrated circuit device of claim 1, wherein the master secret data includes data selected from the group consisting of a master key, a boot record, a file record, and combinations thereof.

12. The integrated circuit device of claim 1, wherein the security state machine is isolated from the clock circuit to inhibit access to the master secret data in the event of a variance of the clock circuit.

13. The integrated circuit device of claim 1, wherein the security state machine includes at least three security states, the at least three security states including a triggered security state, a null security state, and a third state, wherein the security state machine:
is initialized to the triggered security state;
causes the master secret data to be erased when in the triggered security state;
advances from the triggered security state to the null security state only in response to detection of a reset of the integrated circuit device;
causes the master secret data to be erased when in the null security state;
advances from the null security state to a third state in response to a state advance command asserted during initialization of the integrated circuit device;
enables master secret data to be stored by the master secret circuit when in the third state; and
advances to the triggered security state in response to a tamper event.

14. The integrated circuit device of claim 13, wherein the third state comprises an initialized state, wherein the security state machine further includes a secured state, and wherein the security state machine:
enables a debug mode for the integrated circuit device when in the initialized state;
is not responsive to tamper events when in the initialized state;
advances from the initialized state to the secured state in response to a second state advance command asserted upon completion of initialization of the integrated circuit device;
disables the debug mode for the integrated circuit device when in the secured state;
is responsive to tamper events when in the initialized state such that the security state machine advances from the secured state to the triggered security state in response to a tamper event.

15. A method of controlling access to master secret data disposed in at least a portion of at least one persistent region of a single integrated circuit device, the integrated circuit device of the type that includes a security state machine, a master secret circuit, and a clock circuit responsive to an external clock signal, wherein the security state machine and master secret circuit are isolated from the clock circuit, the method comprising:
operating the security state machine and the master secret circuit asynchronously and without reference to the clock circuit;
controlling a security state of the integrated circuit device with the security state machine by advancing the security machine between at least three security states, the at least three security states including a triggered security state and a null security state; and
in response to advancing the security state of the integrated circuit device to each of the triggered security state and the null security state, erasing at least a portion of the master secret data with the master secret circuit.

16. The method of claim 15, further comprising:
controlling access of at least one shadow register to the master secret data, wherein the at least one shadow register is configured to capture the master secret data from, and communicate new master secret data to, the master secret circuit.

17. The method of claim 16, wherein controlling the security state of the integrated circuit device includes:
detecting a tamper event; and
in response to detecting the tamper event, advancing the security state of the integrated circuit device from a secured security state to the triggered security state.

18. The method of claim 15, wherein controlling the security state of the integrated circuit device includes:
detecting a reset of the integrated circuit device; and
in response to detecting the reset of the integrated circuit device, advancing the security state of the integrated circuit device from the triggered security state to the null security state, wherein the security state machine allows the security state of the integrated circuit device to exit the triggered security state only in response to a reset of the integrated circuit device.

19. The method of claim 15, wherein controlling the security state of the integrated circuit device includes:
detecting a power signal being initially supplied to the at least one persistent region; and
in response to detecting the power signal being initially supplied to the at least one persistent region, advancing the security state of the integrated device to the triggered security state.

20. The method of claim 15, wherein the master secret data includes data selected from the group consisting of a master key, a boot record, a file record, and combinations thereof.

21. A program product, comprising:
a non-transitory machine readable medium; and
a design structure stored on the non-transitory machine readable medium, the design structure for use in designing or manufacturing a single integrated circuit device, and the design structure defining:
a clock circuit being responsive to an external clock signal;
a security state machine configured to control a security state of the integrated circuit device, wherein the security state machine is configured to advance between at least three security states and is electrically isolated and additionally isolated from the clock circuit of the integrated circuit device to operate asynchronously and without reference to the clock circuit;
a master secret circuit in communication with the security state machine and configured to control access to master secret data, wherein the master secret circuit is electrically isolated and additionally isolated from the clock circuit of the integrated circuit device to operate asynchronously and without reference to the clock circuit, and wherein the master secret circuit is responsive to the security state machine to erase at least a portion of the master secret data; and
a power-on sense circuit in communication with the security state machine and configured to monitor a power signal to the at least one persistent region of the integrated circuit device and to determine when the power signal is initially supplied to the at least one persistent region of the integrated circuit device, wherein the security state machine is responsive to the power-on sense circuit to erase at least a portion of the master secret data in response to the power-on sense circuit determining that the power signal is being initially supplied to the at least one persistent region.

22. The program product of claim 21, wherein the design structure further defines:
   at least one shadow register in communication with the master secret circuit and configured to capture master secret data from, and communicate new master secret data to, the master secret circuit.

23. The program product of claim 22, wherein the at least one shadow register is further configured to advance the security state of the integrated circuit.

24. The program product of claim 21, wherein the design structure further defines:
   a tamper event circuit in communication with the security state machine and configured to detect a tamper event of the integrated circuit, wherein the security state machine is responsive to the tamper event circuit to advance the security state of the integrated circuit from a secured security state to a triggered security state in the event of the tamper event.

* * * * *